Jan. 3, 1967 C. H. TARR 3,295,829
APPARATUS FOR LEVELING TRAILERS AND THE LIKE
Filed March 19, 1965 2 Sheets-Sheet 1
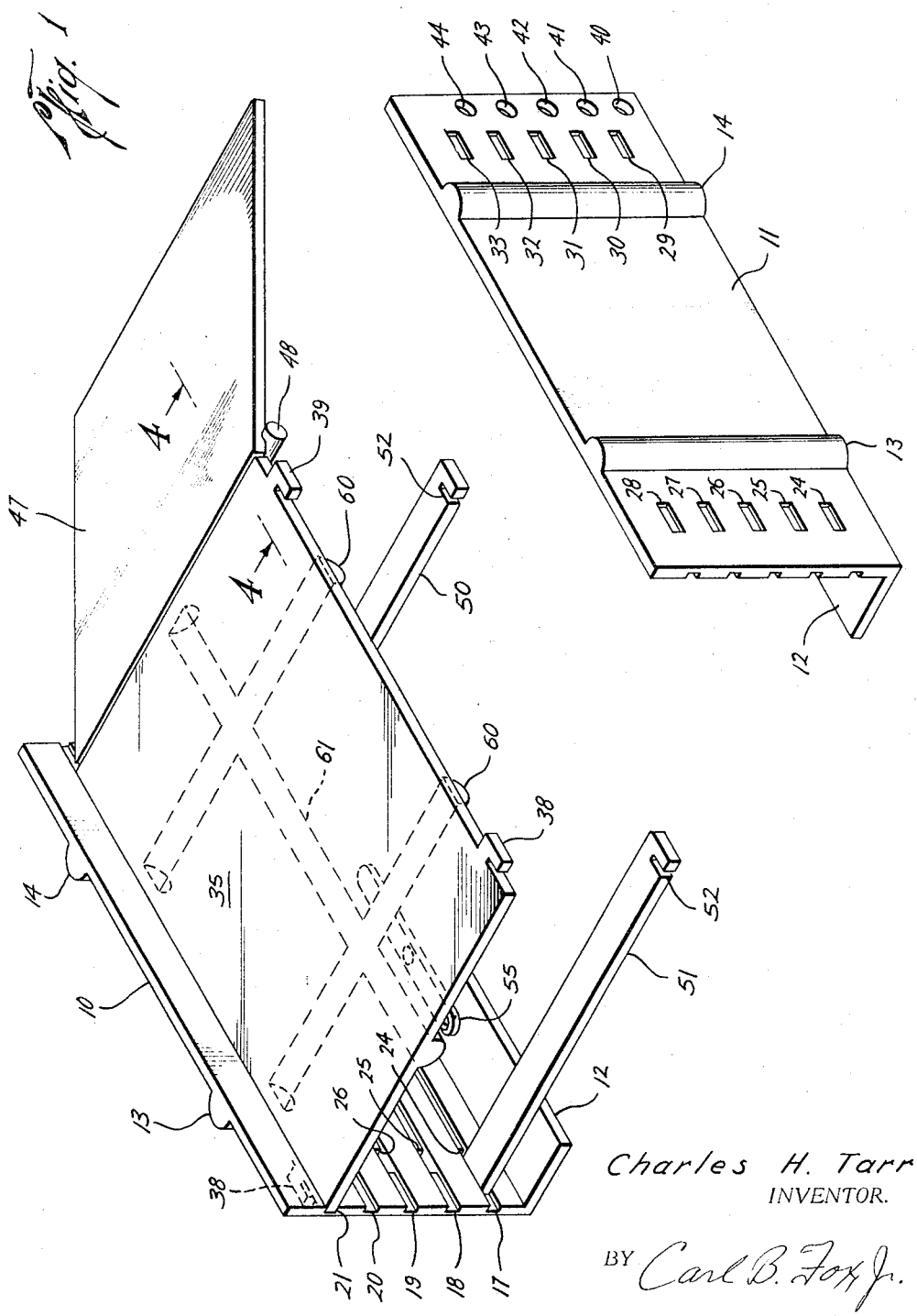
Charles H. Tarr
INVENTOR.
BY Carl B. Fox, Jr.
ATTORNEY Jan. 3, 1967   C. H. TARR   3,295,829
APPARATUS FOR LEVELING TRAILERS AND THE LIKE
Filed March 19, 1965   2 Sheets-Sheet 2
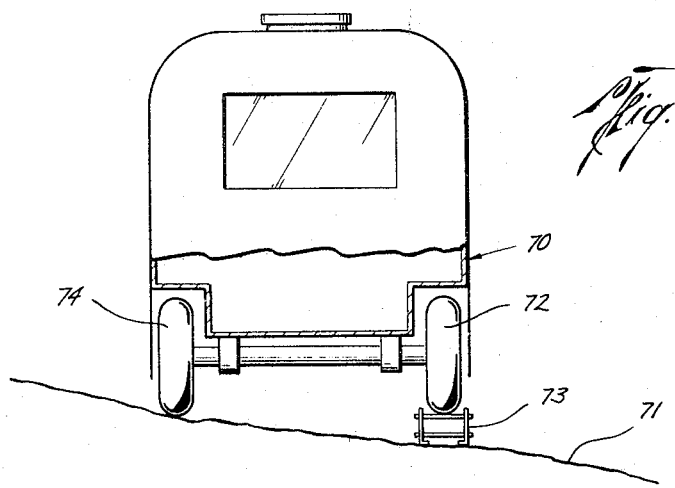
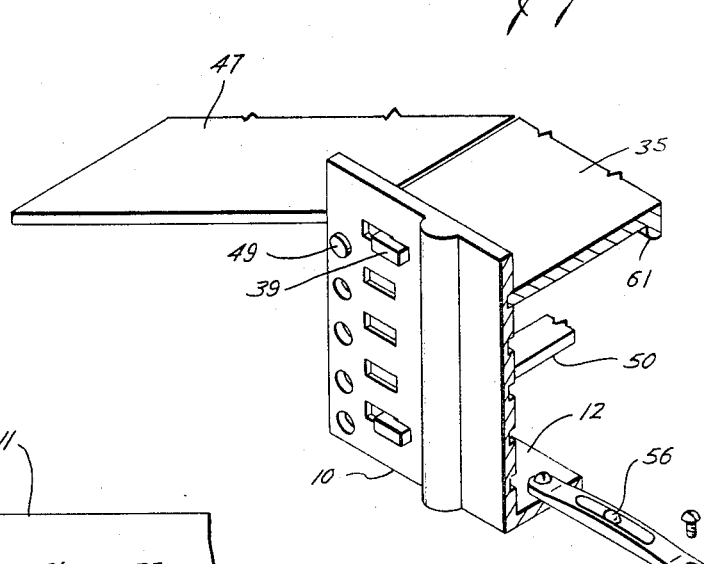
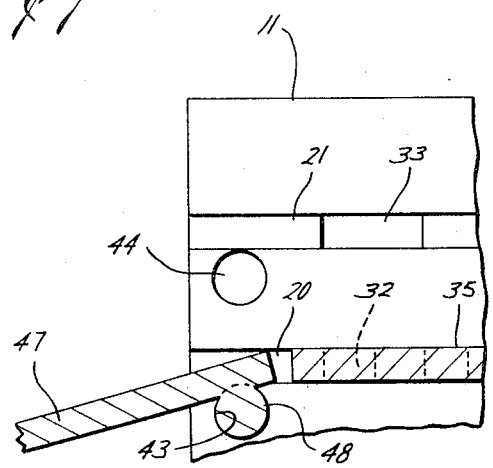
Charles H. Tarr
INVENTOR.
BY Carl B. Fox, Jr.
ATTORNEY

United States Patent Office 3,295,829
Patented Jan. 3, 1967

3,295,829
APPARATUS FOR LEVELING TRAILERS
AND THE LIKE
Charles H. Tarr, 8554 Forum St., Houston, Tex. 77055
Filed Mar. 19, 1965, Ser. No. 441,227
8 Claims. (Cl. 254—88)

This invention pertains to apparatus for use in leveling trailers, or other vehicles.

A principal object of the invention is to provide apparatus for use in leveling trailers, or other vehicles, i.e. by elevating one or more wheels of the trailer or other vehicle to bring the elevated wheel or wheels to the level of one or more other wheels of the vehicle, whereby the trailer or vehicle is leveled and thereafter supported.

Another object of the invention is to provide such apparatus which may be assembled for use and disassembled for storage, and which thereby occupies a small space during storage.

A further object of the invention is to provide such apparatus which is strong, dependable and safe; which includes no fasteners subject to loss; which may include means for predetermining the initial degree of unlevelness of the trailer, or the like; and which may be manufactured at relatively low cost.

Briefly, the invention provides a platform and ramp structure in which the platform and ramp elevations may be adjusted to several levels, so that an elevation for the platform and ramp may be selected to substantially level the trailer, or the like, when the structure is placed beneath a wheel of the trailer, or the like. For vehicles having more than two wheels, plural elevating structures may be employed. The apparatus may be taken apart and stored relatively flat when not in use.

Other objects and advantages of the invention will appear from the following detailed description of a preferred embodiment of apparatus according to the invention, reference being made to the accompanying drawings, of which:

FIG. 1 is a partially exploded perspective view of a preferred embodiment of apparatus according to the invention;

FIG. 2 is an end elevational view showing a preferred use of the apparatus shown in FIG. 1;

FIG. 3 is a partial perspective view of the apparatus of FIG. 1 showing interlock and leveling portions of the apparatus; and, FIG. 4 is a partial vertical cross sectional view taken at line 4—4 of FIG. 1.

The utility of camping trailers, and other vehicles, has in the past been hampered because of the unlikelihood of locating a perfectly level ground surface upon which to park the vehicle at a campsite or other place where the trailer is to be occupied or used. In the case of camping trailers having sinks, washbowls, water closets, etc., their utility is impaired because of failure of water placed therein to drain, or because of failure of the water supply to function properly, or for other reasons, when the vehicle is not leveled. When the floors, chairs and beds are not level, they may become uncomfortable. For these and other reasons, it is desirable that the trailer or other vehicle be leveled for use.

It has been the practice to employ boards or other props in an effort to level trailers, and the like, but these are cumbersome and unreliable, and their use is not always easy. If props were not available or suitable, some have dug out the ground at the location of one or more wheels, piled up dirt, or employed other makeshift methods to achieve leveling.

Final leveling is accomplished by use of screw-jack stabilizers at the corners of the vehicle, or by props, and use of these means should be continued in conjunction with the apparatus hereby provided.

Referring now to the drawings in detail, the apparatus includes two oppositely disposed side support members 10, 11, shown in the drawings as vertically disposed metal plates. Each of the supports 10, 11 has at its lower end a flange 12 inturned so that when the support plates are disposed as shown, the flanges 12 extend toward one another. The supports may include thickened wall portions 13, 14 if necessary in order to improve their strength.

Each support has a plurality of vertically spaced horizontal grooves or slots 17–21, of which there may be any desired number, five being shown in the drawings. These grooves or slots are parallel with the lower edge of the support 10 or 11 and the lower surface of the flange 12 thereof.

The slots 17–21 are of rectangular cross section, and spaced from their ends have vertically aligned rectangular perforations 24–28 and 29–33. These rectangular perforations through the support members are of width equal to the vertical widths of the slots, and are vertically aligned one above the other in each group in each end of each support.

A horizontally disposed plate 35, forming the platform upon which the wheel of the trailer or other vehicle is elevated and supported, is of a length somewhat shorter than the horizontal lengths of the supports 10, 11, and is of a width sufficient to accommodate a tire or wheel of the vehicle. The plate 35 is of a thickness, at least at its opposite edges, to be freely yet with small clearance accommodated within any of the horizontal slots 17–21.

At each side edge, plate 35 has two spaced apart locking keys 38, 39, these being spaced apart by the same distance that the groups of perforations 24–38 and 29–33 are spaced apart. Each locking key 38 is at a distance from an end of plate 35 such that when it is inserted through one of the perforations 24–28, the end of the plate 35 is substantially flush with the ends of the two supports 10, 11.

The other end of plate 35 adjacent the perforations 29–33, is spaced inwardly from the ends of the supports 10, 11. Vertically aligned along this space of each support 10, 11 there are provided vertically spaced holes or circular perforations 40–44 in each support 10, 11. A ramp plate 47 has beneath its upper surface oppositely disposed projecting end bar portions 48, 49 which are adapted to be fitted into opposite holes of the sets of holes 40–44 of the oppositely disposed supports 10, 11. The bar portions 48–49 are closely adjacent to or at the inner end of the ramp plate 47 in order that the bar ends may be easily inserted into the opposite perforations to be closely spaced from the corresponding end of plate 35. The upper end of the ramp plate is supported by the bar projections in the perforations, while the lower end of the ramp plate is usually supported by contact against the ground.

The locking keys 38, 39 at each side of plate 35 are each of L-shaped configuration as shown. The portion of each locking key parallel to the side of plate 35 is movable through any of the perforations 24–28 and 29–33. When a key has been inserted through a perforation, the plate and support are relatively moved to lock a side of the perforation in the slot between the side of the plate and the parallel part of the key. The keys at each end of the side of the plate are locked in place simultaneously.

With the inner end of ramp 47 fixed with the bar ends in opposite holes corresponding to the elevation of plate 35, the inner end of plate 47 holds plate 35 against movement which would release the keys at the sides of plate 35. Plate 35 must be turned so that movement of the plate toward ramp 47 is necessary to release the keys in order for the ramp to lock plate 35 in place. When the ramp plate is rotated about bar portions 38, 39 to be against the ends of flanges 12, then clearance is provided between plate 35 and plate 47 whereby plate 35 may be moved to release the locking keys from the locking key perforations.

A pair of identical locking bars 50, 51 of the same length as the width of plate 35 are disposed through opposite locking key perforations, usually those of the lowermost slots 17. These locking bars have end recesses 52 at each end so that their ends correspond in form to the locking keys of plate 35. The locking bars may be inserted into the appropriate locking perforations and locked in place whereby to stabilize the lower parts of support elements 10, 11. The locking bars may face in either direction horizontally of the supports 10, 11.

To assemble the apparatus, the elements are placed together as shown in the drawing. One easy manner of doing this is to place one of the supports 10, 11 flat upon a surface with the slots facing upwardly, placing the plate 35 disposed vertically with the locking keys through the perforations of the slot at a level desired for location of the platform plate 35, placing the other support 10 or 11 with the upwardly facing locking keys inserted in the proper perforations while at the same time inserting the end bar portions 48, 49 through a pair of the opposed perforations 40–44 before finally bringing the locking keys 38, 39 completely through the upper support, and then running the locking bars through opposite perforations from the outside of one of the support plates to bring the end recesses into engagement about the support plates at the sides of the perforations. Disassembly of the apparatus is done by reversing these steps. From what has been said, it will be apparent that ramp plate 47 should be rotated against flanges 12 while the upper support plate is being put in place, so that there will be clearance for engagement of the upwardly facing locking keys 38, 39.

Upon the upper surface of one of the flanges 12 of one of the support members 10, 11, there may be disposed a spirit or other level 55. The level is of customary form, usually including a curved or straight glass or plastic transparent tube, within which there is a liquid and a bubble 56. When the level is level, the bubble is at the center of the tube and when the level is unlevel, the bubble moves to one or the other end of the tube. The level tube may be calibrated to indicate that the trailer is tilted to a certain degree from level. Therefore, the support member having the level carried thereon is placed with flange 12 flat upon a surface of the trailer which ultimately should be level, and the amount of unlevelness can be determined by the distance of the level bubble from the center of the tube. The tube may be calibrated corresponding to the slots 17–21 so that it may be readily determined which slot 17–21 should receive the platform plate 35 to substantially level the trailer. If the slots 17–21 are spaced one inch apart, the use of the level will provide that the trailer will be within one-half inch of being level. After the degree of unlevelness has been determined, the apparatus is assembled with plate 35 in the proper slots, so that the trailer wheel will be elevated the desired amount, and the apparatus is placed in position and the trailer moved so that its wheel to be elevated rolls up ramp 47 onto plate 35. Then the final leveling may be done by use of stabilizers or other prop apparatus to finally level the trailer.

Plates 35 and 47 may be reinforced by thickened portions or ribs 60, 61 in order to have the required strength. Other means of strengthening plates 10, 11, 35 and 47 may be used as desired.

The flanges 12 of support members 10, 11 prevent the supports from penetrating the earth's surface unduly.

The level 55 may be utilized to level the trailer or other vehicle in directions perpendicular or angular to the axis of the opposite trailer wheels. Normally, the apparatus will be used for two-wheel trailers to elevate one wheel of the trailer. But the apparatus may be also used to elevate one or more wheels of trailers having more than two wheels. Of course, when two wheels are to be elevated, two apparatuses must be used.

In FIG. 2 of the drawings there is shown a two-wheeled trailer 70 supported upon sloping ground surface 71. The apparatus of FIGS. 1, 3 and 4 is shown disposed beneath one wheel 72 of the trailer at 73. The trailer is substantially leveled since the apparatus elevates wheel 72 to the approximate level of opposite trailer wheel 74.

The apparatus, when properly assembled is very strong and safe in use. Its rigidity is improved once the trailer weight is placed on the apparatus, since the locking keys and bars then become firmly frictionally engaged and cannot be displaced. The locking keys and the ends of the locking bars are not subjected to excessive forces. The plate 35 is supported along the full lengths of its side edges which are in the slots of the support members.

The apparatus may be made by fabrication from metal plate stock, such as, aluminum, steel, or the like, or may be cast in the desired forms. When suitable plastic or ceramic materials are available, these may be substituted for the metal fabrication normally employed.

While a preferred embodiment of the invention has been shown and described, many modifications thereof may be made by a person skilled in the art without departing from the spirit of the invention, and it is intended to protect by Letters Patent all forms of the invention falling within the scope of the following claims.

I claim:

1. Wheel elevating and support apparatus, comprising inclined ramp means having oppositely projecting bar portions at its upper inner end, platform means having laterally projecting locking key portions at opposite sides, a pair of facing support elements each having a plurality of vertically spaced socket openings adjacent one end each adapted for receiving a said projecting bar portion of said ramp means to support the upper inner end of said ramp means at a particular selected level, said support elements each having in its face the same plurality of vertically spaced horizontal slot means as said plurality of socket openings and each said slot means being disposed and adapted to receive and support a side of said platform means at a vertical level corresponding to one said selected level of the upper inner end of said ramp means, said support elements each having perforation means associated with each said slot means to releasably receive and engage said locking key portions of said platform means when a side of said platform means is received and supported in any of its said slot means, whereby a wheel may be elevated by rolling up said ramp means and supported in elevated condition upon said platform means.

2. Combination of claim 1, including cross bar means adapted to be releasably received and engaged at their opposite ends in opposite perforation means of said support elements not occupied by said locking keys of said platform means to laterally reinforce said support elements.

3. Combination of claim 1, wherein the full lengths of said opposite sides of said platform means are supported vertically in said slot means.

4. Combination of claim 1, said locking key portions of said platform means each being L-shaped and the outer part thereof being movable through a said perforation means and laterally of the perforation means to interlock the key portion in the perforation means, said upper inner ramp end being closely adjacent an end of said platform means, said key portions being directed when so interlocked as to be held against unlocking by said upper inner ramp end disposed closely adjacent the end of said platform means.

5. Combination of claim 4, said projecting bar portions of said ramp means being below the plane of said ramp means, said socket openings of each support element each being below the slot means associated therewith as described for supporting said platform means at a vertical level corresponding to one said selected level of the upper inner end of said ramp means, said bar portions and socket openings having circular cross sections whereby said ramp means may be rotated to move the ramp means away from its said close adjacency to said platform means whereby said locking keys may be released from said perforations.

6. Ramp and platform apparatus, comprising parallel vertically disposed side plates having facing corresponding horizontal grooves at a plurality of vertically spaced levels, platform plate means inserted along its opposite sides in corresponding grooves of said side plates to be vertically supported, said side plates having facing corresponding holes therethrough at one end of said grooves each disposed somewhat lower than one of said grooves to be associated therewith, said side plates having facing corresponding perforations therethrough at the bottoms of said grooves and said platform plate having extending key means removably locked in the perforations of the groove in which the platform plate is supported, a ramp plate having oppositely outwardly extending bar portions of circular cross sections pivotally inserted in the said holes of said side plates which are associated with the grooves supporting the platform plate means.

7. Combination of claim 6, including cross bar means interlocked between corresponding perforations of said side plates to brace said side plates.

8. Apparatus for use in elevating and supporting a wheel of a trailer, or the like, comprising oppositely disposed vertical support elements, a platform element releasably interlocked between said support elements adapted to support a wheel of a trailer, or the like, placed thereon, means for releasably interlocking said support elements and said platform element at selective different vertical levels of said support elements, and ramp means pivotally releasably interlocked at its inner end with said support elements so that its inner upper surface is closely adjacent the upper surface of said platform element, whereby said ramp means and platform element form a substantially continuous ramp and platform onto which the wheel may be rolled to elevate and support the wheel and substantially level the trailer, or the like.

References Cited by the Examiner

UNITED STATES PATENTS

| | | | |
|---|---|---|---|
| 1,915,320 | 6/1933 | Jones | 248—188.2 |
| 1,970,172 | 8/1934 | Hull | 254—88 |
| 3,030,730 | 4/1962 | Costar | 248—23 X |
| 3,178,156 | 4/1965 | Ribers | 254—88 |

CLAUDE A. LE ROY, *Primary Examiner.*

R. P. SEITTER, *Assistant Examiner.*